(12) United States Patent
Beckmann et al.

(10) Patent No.: US 6,675,388 B1
(45) Date of Patent: Jan. 6, 2004

(54) DATA DISTRIBUTION SYSTEM USING COORDINATED ANALOG AND DIGITAL STREAMS

(75) Inventors: William H. Beckmann, Cross River, NY (US); Steven W. Depp, Katonah, NY (US); Jurij R. Paraszczak, Pleasantville, NY (US); Frank A. Schaffa, Hartsdale, NY (US); David I. Seidman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,689

(22) Filed: Jan. 29, 1999

(51) Int. Cl.⁷ .............................. H04N 7/16
(52) U.S. Cl. .................. 725/136; 725/70; 725/136; 725/139; 725/151; 348/726; 348/725; 348/731
(58) Field of Search ................ 348/726, 725, 348/731; 725/63, 68, 70, 135, 136, 139, 151, 144, 148, 34, 35, 109, 110

(56) References Cited

U.S. PATENT DOCUMENTS

| | | | |
|---|---|---|---|
| 5,341,474 A | | 8/1994 | Gelman et al. |
| 5,446,919 A | * | 8/1995 | Wilkins |
| 5,585,858 A | * | 12/1996 | Harper et al. ............ 348/485 |
| 5,734,853 A | | 3/1998 | Hendricks et al. |
| 5,742,680 A | | 4/1998 | Wilson |
| 5,790,753 A | | 8/1998 | Krishnamoorthy et al. |
| 5,805,825 A | | 9/1998 | Danneels et al. |
| 5,808,694 A | | 9/1998 | Usui et al. |
| 5,848,352 A | * | 12/1998 | Dougherty et al. |
| 5,861,881 A | * | 1/1999 | Freeman et al. |
| 5,886,995 A | * | 3/1999 | Arsenault et al. |
| 6,112,180 A | * | 8/2000 | Mitsuhashi et al. |
| 6,188,448 B1 | * | 2/2001 | Pauley et al. |
| 6,212,680 B1 | * | 4/2001 | Tsinberg et al. |

FOREIGN PATENT DOCUMENTS

EP         0536828 A1 * 4/1983 .......... H04N/7/087

* cited by examiner

Primary Examiner—Chris Grant
Assistant Examiner—Ngoc Vu
(74) Attorney, Agent, or Firm—Scully Scott, Murphy & Presser; Thu Ann Dang, Esq.

(57) ABSTRACT

The present invention uses multiple broadcast television channels to distribute high volume of data to a client device from a server. Multiple analog channels are broadcast, at least one of which contains video/audio programs and control data inserted into the analog signal's VBI; and at least one separate channel contains a digital data stream which is modulated onto an analog channel and associated with channels containing those video/audio programs. STBs designed to implement this invention are equipped with at least two tuners in order to tune to two of those channels simultaneously. One tuner is used to tune to the video/audio channel, and extract the control data in the VBI. The second tuner is used to tune to the channels containing the data itself.

22 Claims, 3 Drawing Sheets

DATA DISTRIBUTION SYSTEM USING COORDINATED ANALOG AND DIGITAL STREAMS

BACKGROUND OF THE INVENTION

1. Field of the Invention

The field of art to which this invention relates is broadcast television. It is more particularly directed to an apparatus and a method for coordinating the concurrent distribution of information sent over separate channels.

2. Description of Prior Art

Methods for the distribution of data are well known in the art. Clearly, data is distributed among the users of a local area network (LAN), and the same applies for a variety of network types. Capabilities for the broadcast distribution of data exist in the context of LANs as well as in other contexts, such as teletext systems.

Broadcast distribution systems may be used for the distribution of a variety of data types including text, graphics, video, and audio. However, the distribution of the data in these systems is not associated with a parallel broadcast of a video program.

Data carousel systems, such as the one described in U.S. Pat. No. 5,805,825, are designed to cyclically broadcast units of data to users. These systems, which may be analog or digital, may use video-related protocols and architectures for the transport of data on the carousel, but as above, the data distribution is not associated with a parallel broadcast of a video program on another channel.

Systems which are well known for the distribution of program scheduling information, in tandem with a video broadcast, are identified as Electronic or Interactive Program Guides (EPGs). Some systems for the distribution of EPG data, such as that described in U.S. Pat. No. 5,808,694 use a separate channel, such as a telephone line, into the Set-Top Box (STB) for downloading program information. Other systems, such as satellite digital video systems, use a cyclic periodic broadcast of program information.

Systems such as these do not require, or supply, a great deal of bandwidth for the data transport, since program information does not change frequently. A separate television channel is not used for the EPG data, since this would be a great waste of that channel's bandwidth. That is because the EPG data consists of scheduling information for video programs, but is not coordinated with the actual content throughout that program.

Other systems for data distribution which are not coordinated with video, include U.S. Pat. No. 5,790,753, used for the download to STBs, of program software, and U.S. Pat. No. 5,341,474.

Set-top boxes are well known in the art. They may take analog input, or digital, or both. Since most monitors take analog input, even digital-input STBs have analog video and audio outputs. Examples of STBs are U.S. Pat. No. 5,734,853 having an analog/digital input, and U.S. Pat. No. 5,742,680 having digital input only. These referenced STBs do not extract data from an incoming broadcast stream.

Closed-caption information is commonly distributed along with the content of a video program, in the Vertical Blanking Interval (VBI) of an analog broadcast. This information is not closely synchronized with the video content. Additionally, only a small amount of data, roughly 200 Kbps, may be transported using VBI and architectural limitations prevent isochronous data from being transported using VBI.

Currently, a transition is in progress from analog television broadcasts, using broadcast standards such as NTSC to digital television broadcasts using broadcast standards such as ATSC. STBs are available to handle NTSC, ATSC, both ATSC and NTSC, or purely digital transmissions, such as those used for satellite distribution of digital television such as DVB in Europe and Australia or ARIB in Japan. However, even STBs which can handle analog and digital broadcasts do so in an either/or manner—a channel is either analog or digital, and the content of an analog channel is not coordinated with the content of a digital channel.

What is needed is a system for the distribution of a high volume of data coordinated with the content of a video program where coordination includes matching data content to the video content throughout the program and a tight synchronization for the transport of isochronous data. That system may be used in the context of analog or digital television broadcasts, and in systems which are in transition between analog and digital modalities. An analog channel of that system may be used for both the transport of video and audio content as well as for the transport of information which may be used to coordinate the content of the analog channel with the content of another possibly digital-content channel.

SUMMARY OF THE INVENTION

The present invention uses multiple broadcast television channels to distribute high volume of data to a client device from a server. Multiple analog channels may be broadcast, at least one of which contains video/audio programs, and at least one separate channel contains data associated with channels containing those video/audio programs.

The channels containing the analog video/audio signal also contain control data inserted into the analog signal's VBI. This channel's content may be viewed using any conventional analog STB. STBs designed to implement this invention are equipped with at least two tuners in order to tune to two of those channels simultaneously. One tuner is used to tune to the video/audio channel, and extract the control data in the VBI. The second tuner is used to tune to the channel containing the data itself, a digital data stream which is modulated onto an analog channel.

The control data extracted from the video/audio channel contains pointers to the data units available on the data channel. When the user requests access to supplementary data, e.g., by replying to an on-screen notification that data is available, the STB uses the control data to locate and access the data on the data channel. The supplementary data may be closely associated with the content of the video channel and can be tightly synchronized with that content.

Some of the advantages of this data distribution system include:

(1) the high volume of data which can be delivered, in contrast with the low bandwidth available with analog data distribution systems such as those using VBI only;

(2) the compatibility of this system with existing analog broadcast systems and STB's, and (3) the migration path this system provides as broadcast systems move from analog to digital.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

The present invention is a system which is used for the distribution of data in conjunction with the broadcast of a video program. The invention enables a high volume of data to be distributed to the users, and offers the capability of close coordination and tight synchronization with the video and audio content of the program. This coordination allows data to be associated with 1. an entire video program,
2. any time segment thereof,
3. any spatial region therein, and
4. any time-and-space segment therein.

Many applications utilizing data distributed in such manner are enabled by the invention, they include:

E-commerce—where conventional products, such as clothing, may be offered for sale and purchased, using data such as catalog page images and text to distribute product information;

Educational—video programs may be annotated with a great deal of ancillary distributed data for viewers interested in further researching topics mentioned in those programs.

Software—software programs for execution on the STB or other computing devices, such as PCS, laptops, palmpilots, etc.., may be associated with a video program for purchase or free distribution. A removable storage device or another type of connection from the STB to a computing device may be required.

It should be noted that while the description of the invention has focused on the broadcast distribution of a video program and data associated therewith, a data enhanced program distributed according to the invention may be recorded and played back at the viewer's leisure. The same functionality, performed by the STB in the broadcast mode, i.e., extraction of control information from the VBI, managing the user interface, etc, may be performed in the play back mode, provided the data is available on the data channel at the time of the playback.

Figure 3:
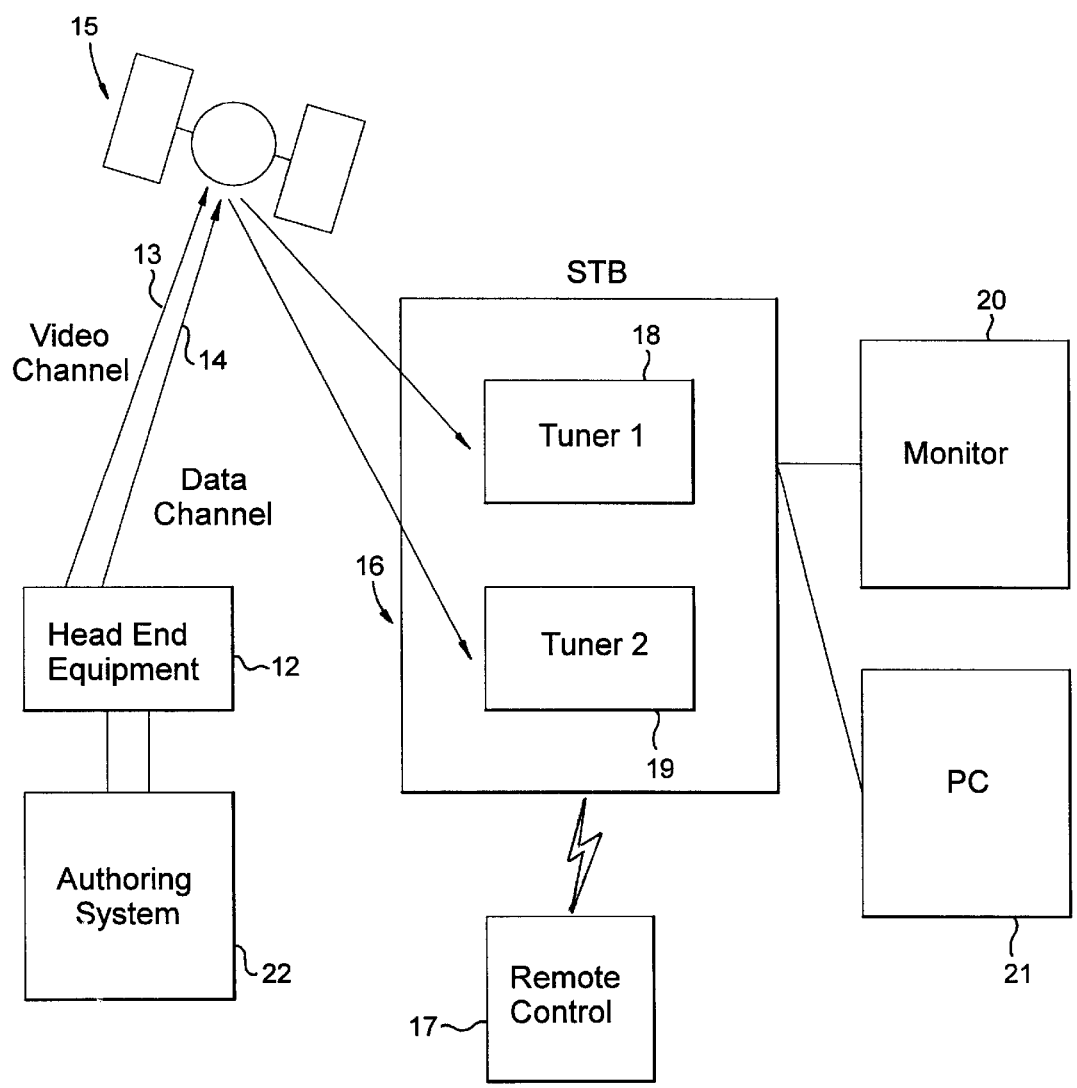
FIG. 3 is a System Architecture diagram, showing an example of a network which uses the present invention to distribute data over a satellite channel to viewers.

In view of FIG. 3, the following are the elements of the invention.

Authoring system 22—adds the control information into the VBI of the video channel. The authoring system allows an operator to specify the control information, off-line and pre-recorded, or done on a live basis for sports broadcasts for example, and thus the associated data to be associated with a given segment of a video program.

Head end equipment 12—the video 13 and data 14 channels are broadcast over the broadcast medium 15, i.e., the satellite medium as shown in the example of FIG. 3. The addition of control information to the VBI of the video channel may be done off-line, or live, by an authoring system.

Broadcast distribution network—The video and data channels are broadcast, by the head end, over a distribution network.

A client device 16—inherently a "hybrid" device, where one channel to which it tunes is primarily analog in content, while the other is digital in content, two tuners are required. This device may be a STB such as shown in FIG. 3. The client device must be able to:

1. tune to the video channel,
2. tune to the data channel at the same time,
3. extract control information from the VBI of the video channel,
4. present a data availability notice to the viewer, via the user interface,
5. receive viewer requests for data, via the user interface,
6. respond to viewer requests for data, by downloading, storing, or graphically presenting the requested associated data to the viewer or storage device(s).

FIG. 3 shows an example of a network using the data distribution system presented in this invention. As shown, two sets of channels are broadcast from the Head End 12, video channels 13 and data channels 14. One set of channels 13 contains the analog video/audio signals as well as control data inserted into the analog signals' VBI. Those channels' content may be viewed using any conventional analog STB. The second set of channels 14 contains the data itself, which may be a digital data stream modulated onto an analog channel.

Both sets of channels are received by the satellite 15 and distributed to terrestrial receiving equipment such as STB 16. Note that other distribution media, such as a cable television infrastructure, may be used in place of the satellite medium. It should be understood that more than two channels may be utilized for broadcasting.

In one embodiment of the present invention, the two sets of channels 13, 14 are carried in 6 MHZ bands of the transmission medium's spectrum, as is the case for the NTSC broadcast standard, used in the United States and Japan. In another embodiment of the present invention, these two sets of channels 13,14 are carried in 8 MHZ bands of the transmission medium's spectrum, as is the case for the PAL broadcast standard, used in Europe. Other broadcast standards, such as SECAM, can be used for other embodiments.

Figure 1:
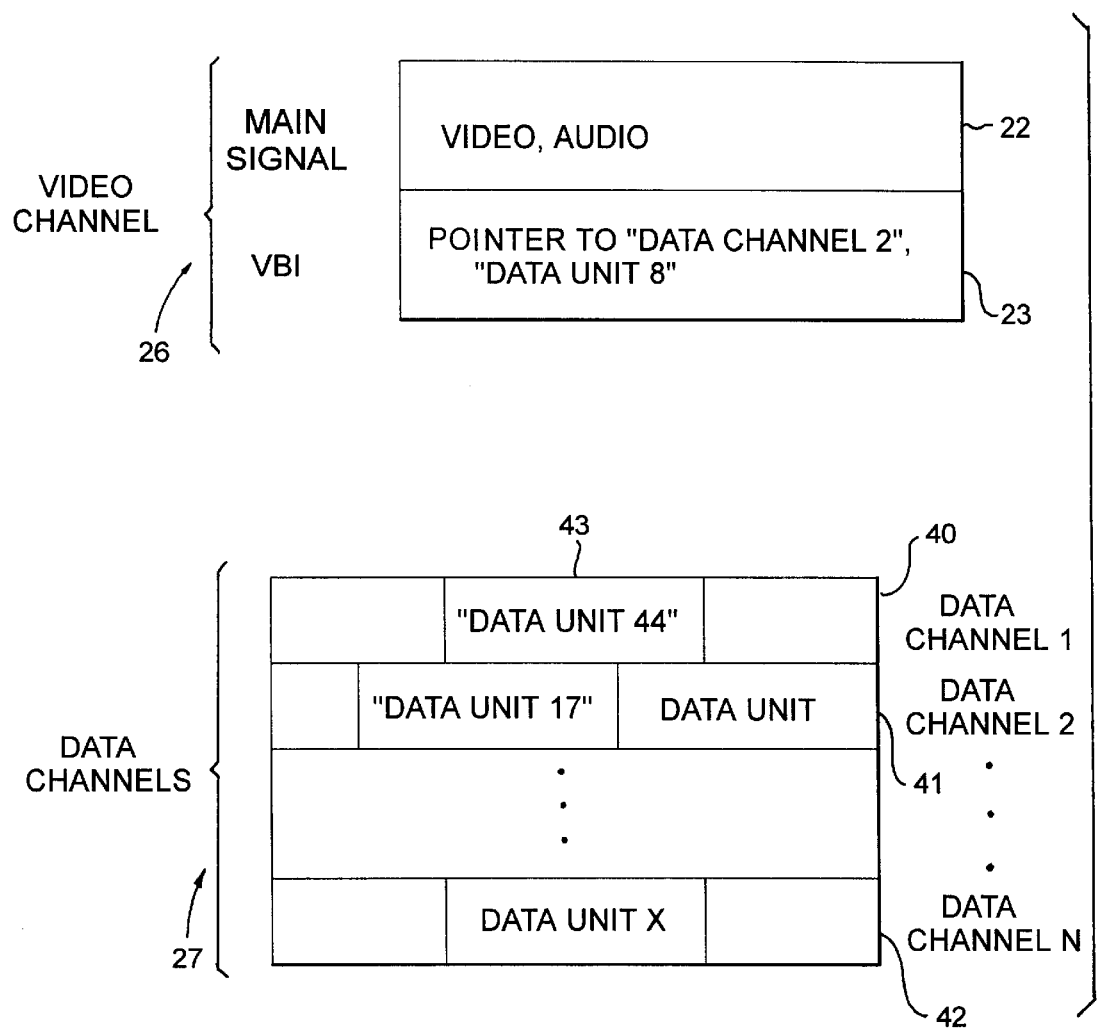
FIG. 1 is a block diagram of Channel Architecture, showing how the data to be distributed is managed in the video and data channels, where pointers in the VBI of the video channel coordinate the content of that channel(s) with the data available on the data channel(s).

FIG. 1 shows the contents of the two channels. The video channel 26 consists of a main signal 22, with the video an audio content, as well as control data 23 in the Vertical Blanking Interval which contains pointers to data contained in the data channel 40, 41, and 42. The data channels group 27 consists of one or more data channels 40,41 and 42 which contain the actual data to be delivered to the interested viewer. This data is separated into data units 43, which are addressable by the control data 23 in the video channel 26.

Returning back to FIG. 3, both sets of channels are received at STB 16 where one tuner 18 is dedicated to the video channel while another tuner 19 is dedicated to the data channel. Where there is a need to accept data from multiple data channels 14 multiple tuners 19 may be used. The present invention receives the information from both a video and data channel and, depending on the content, may prompt the viewer using a user interface which may display appropriate viewer choices on the monitor 20. The viewer may respond using a remote control 17 to initiate a particular function, made available by the arrival of the data at the STB.

The desired data is then displayed on the TV monitor 20, downloaded to a PC 21 or saved on the STB device 16 or dealt with in a similar manner. The download can be immediate, or scheduled for a more convenient time, for example, if the PC is being used at the time of the viewer's request, the STB can download the data to it at an off-peak usage time or at any viewer desired time, provided the data is available on the data channel at that time.

Figure 2:
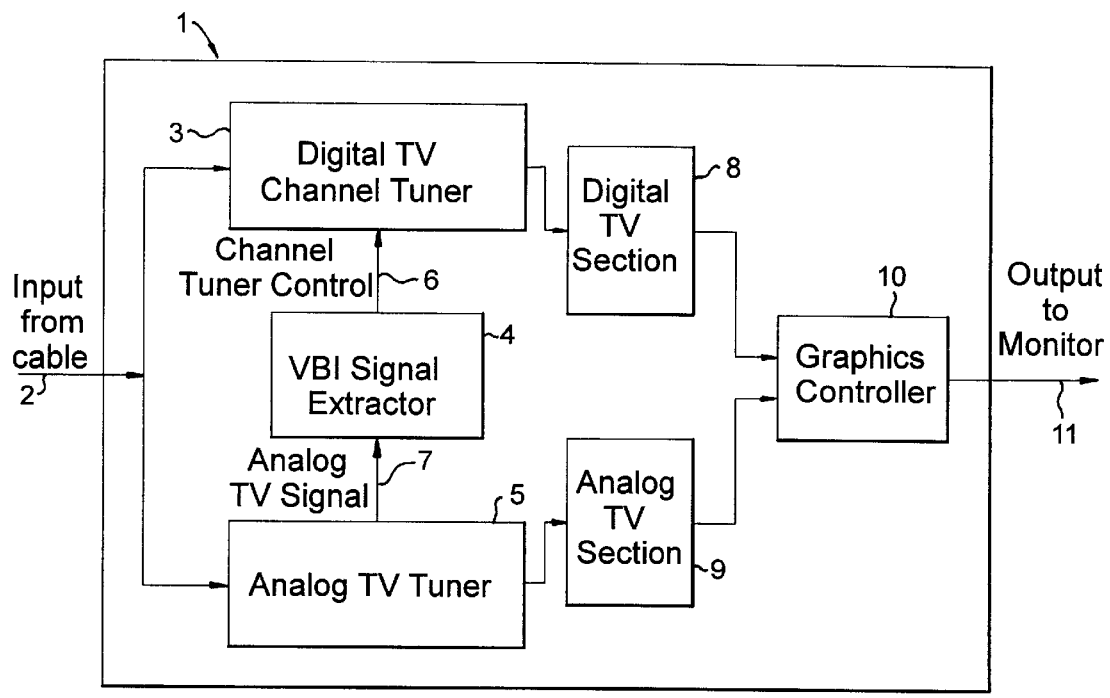
FIG. 2 is a block diagram of an analog/digital set-top box which may be used to implement the invention. The input signal is shown entering both an analog and a digital tuner. Control data is extracted from the VBI and used to tune the digital tuner for access to data on the data channel.

FIG. 2 shows the STB 1 where the analog TV tuner 5 is tuned to the video channel, and sends that channel's analog signal 7 to the VBI signal extractor 4. The VBI signal extractor 4 extracts channel tuner control signals 6 and sends them to the digital TV channel tuner 3. The channel tuner control signals 6 specify which data channel and data unit, if any, is being requested by the viewer, and the digital TV channel tuner 3 is tuned to the data channel requested. Digital TV section 8 and analog TV section 9 tuning circuitry are used for decoding and formatting the data and video channels, respectively. The output of this circuitry is combined by a graphics controller 10, and its output 11 is sent to the monitor 20 (FIG. 3) and/or a computing device 21 (FIG. 3).

In one embodiment of the present invention, the data which is associated with the video content is static data, such as charts and text. In another embodiment, the data is isochronous, such as streaming video or audio.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for distributing broadcast of data over one or more channels of a broadcast network, said method comprising steps of:
    broadcasting a first type content and a second type content over separate channels;
    receiving broadcast content on a client device as requested by a viewer by tuning to channels, a tuned channel carrying said first type content, said first type content having control information for providing at least one channel number related to data units associated with a second type content;
    decoding said first type content and extracting control information from said first type content;
    receiving and decoding said second type content and extracting the data units associated with the second type content based on the control information;
    combining broadcast content and data units of said second type content at the viewer location; and
    displaying to a viewer said combined content.

2. The method of claim 1, further comprising steps of:
    accepting a viewer selection specifying which of said data units are to be displayed.

3. The method of claim 1, wherein a high volume of said second type content is distributed.

4. The method of claim 3, wherein said second type content is distributed in close coordination and highly synchronized with said first type content.

5. The method of claim 4, further comprising a step of authoring, wherein said control information is inserted at appropriate times and at appropriate locations in said first type content.

6. The method of claim 5, wherein said first type content is analog multimedia content and said second type content is a digital data content modulated onto an analog channel.

7. The method of claim 6, wherein said control data is inserted into a Vertical Blanking Interval of said first type content.

8. The method of claim 7, wherein said client device further comprises the steps of:
    combining, converting and presenting to said viewer said decoded first type content and said decoded second type content.

9. The method of claim 8, wherein said client device is analog.

10. The method of claim 8, wherein said client device is wholly digital.

11. The method of claim 8, wherein said client device is hybrid analog/digital.

12. A computer program device readable by a machine, tangibly embodying a program of instructions executable by a machine to perform method steps for distributing broadcast of data over one or more channels of a broadcast network, said method comprising steps of:
    broadcasting a first type content and a second type content over separate channels;
    receiving broadcast content on client device as requested by a viewer by tuning to channels, a tuned channel carrying said first type content, said first type content having control information for providing at least one channel number related to data units associated with a second type content;
    decoding said first type content and extracting control information from said first type content;
    receiving and decoding said second type content and extracting the data units associated with the second type content based on the control information;
    combining broadcast content and data units of said second type content at the viewer location; and
    displaying to a viewer said combined content.

13. The method of claim 12, further comprising steps of:
    accepting a viewer selection specifying which of said data units are to be displayed.

14. The method of claim 13, wherein a high volume of said second type content is distributed.

15. The method of claim 14, wherein said second type content is distributed in close coordination and highly synchronized with said first type content.

16. The method of claim 15, further comprising a step of authoring, wherein said control information is inserted at appropriate times and at appropriate locations in said first type content.

17. The method of claim 16, wherein said first type content is analog multimedia content and said second type content is a digital data content modulated onto an analog channel.

18. The method of claim 17, wherein said control data is inserted into a Vertical Blanking Interval of said first type content.

19. The method of claim 18, wherein said client device further comprises the steps of:
    combining, converting and presenting to said viewer said decoded first type content and said decoded second type content.

20. The method of claim 19, wherein said client device is analog.

21. The method of claim 19, wherein said client device is wholly digital.

22. The method of claim 19, wherein said client device is hybrid analog/digital.

* * * * *